United States Patent [19]

Francois et al.

[11] Patent Number: 4,936,620
[45] Date of Patent: Jun. 26, 1990

[54] ARRANGEMENT OR ORGANIZATION OF SEATS INSIDE THE PASSENGER AREA OF VEHICLE

[75] Inventors: Braun François; Braun Yves, both of Kraainem, Belgium

[73] Assignee: S.A. Seatco N.V., Brussels, Belgium

[21] Appl. No.: 608,439

[22] Filed: May 9, 1984

[30] Foreign Application Priority Data

May 16, 1983 [FR] France .................. 83 08078

[51] Int. Cl.$^5$ ............................ B64D 11/06
[52] U.S. Cl. .................. 296/64; 244/118.6; 105/345
[58] Field of Search ............... 296/64, 65 A; 105/329 R, 344, 345; 297/232, 248; 244/118.5, 118.6; 52/8

[56] References Cited

U.S. PATENT DOCUMENTS

| | | | |
|---|---|---|---|
| 1,743,149 | 1/1930 | Lyford | 296/64 |
| 2,046,859 | 7/1936 | Weiss et al. | 296/64 |
| 2,414,730 | 1/1947 | Flogaus | 296/64 |
| 2,557,885 | 6/1951 | Murphy et al. | 105/344 |
| 2,606,727 | 8/1952 | De Haven | 244/118.6 |
| 2,947,349 | 8/1960 | Kryter | 296/64 X |
| 3,730,583 | 5/1973 | Colovas et al. | 296/64 |
| 3,893,729 | 7/1975 | Sherman et al. | 296/64 X |
| 3,910,632 | 10/1975 | Marechal | 297/232 |

FOREIGN PATENT DOCUMENTS

| | | | |
|---|---|---|---|
| 7529 | 1/1977 | Japan | 297/232 |
| 733081 | 7/1955 | United Kingdom | 296/64 |

Primary Examiner—Russell D. Stormer
Attorney, Agent, or Firm—Schiller, Pandiscio & Kusmer

[57] ABSTRACT

An arrangement or organization of seats inside a passenger area of a vehicle for transporting passengers, the vehicle being the type comprising a floor, a ceiling and lateral walls which run between the front and rear ends of the passenger area. The plane of symmetry of those seats which are adjacent to the aisle each form, with the longitudinal plane of symmetry of the aisle, an acute angle opening towards the front of the seats, whereas the plane of symmetry of those seats which are adjacent to a lateral wall in the passenger area and the longitudinal plane of symmetry of the aisle are parallel.

8 Claims, 6 Drawing Sheets

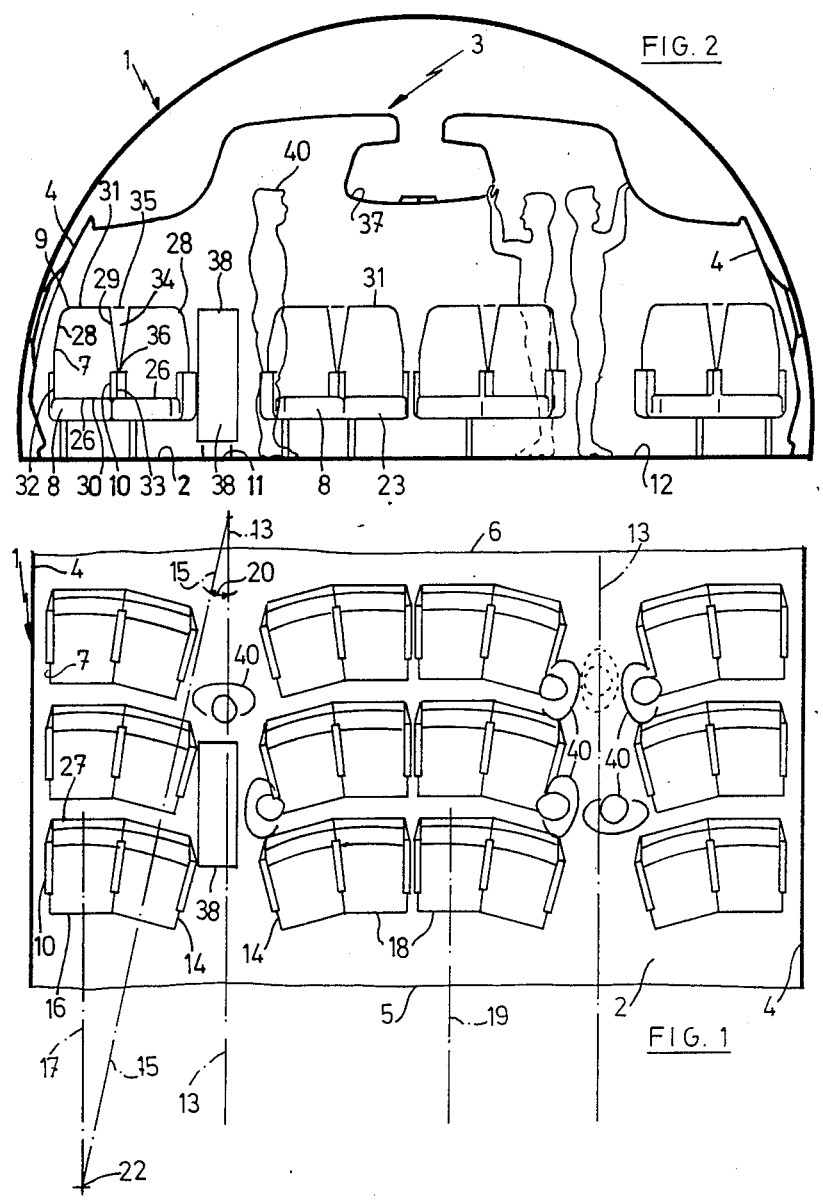

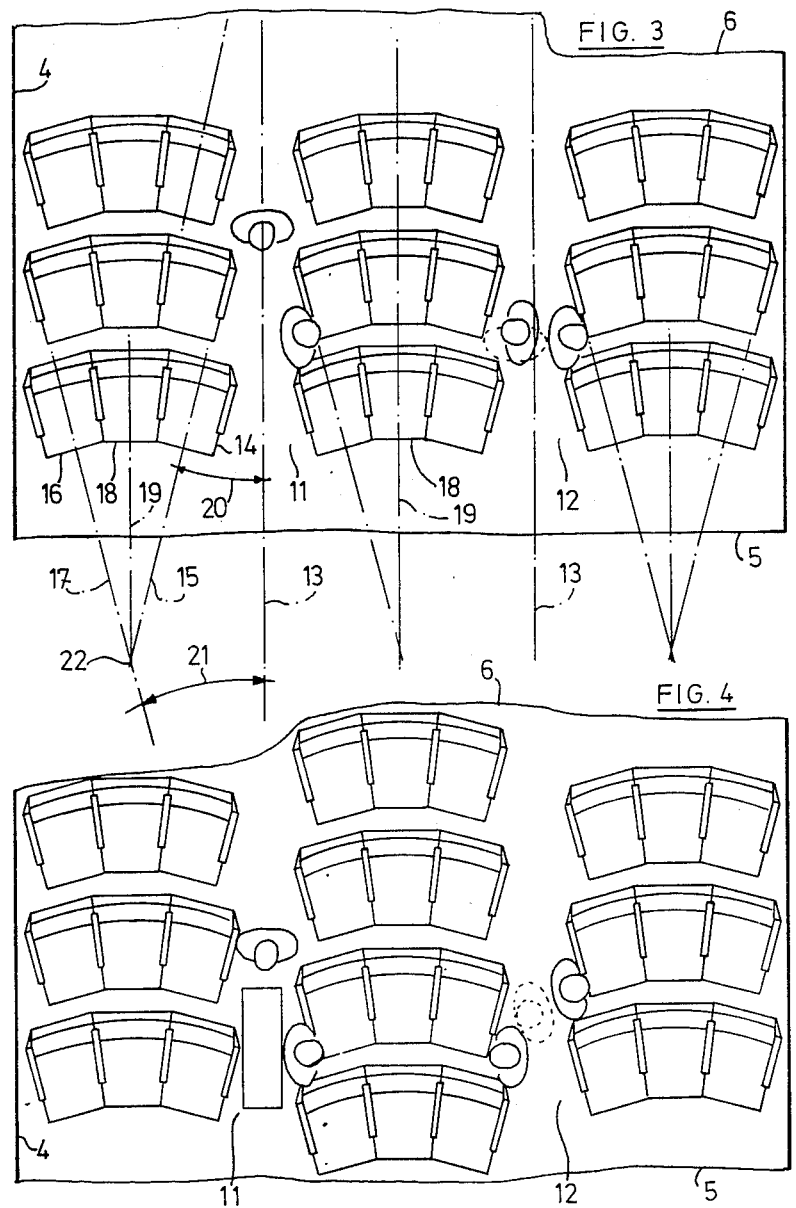

ARRANGEMENT OR ORGANIZATION OF SEATS INSIDE THE PASSENGER AREA OF VEHICLE

BACKGROUND OF THE INVENTION

The present invention relates to the arrangement or organization of seats each of the type comprising a back, a base and arm rests and positioned inside the passenger area of a vehicle fitted for the transportation of passengers. The vehicle is of the type comprising a floor, a ceiling and lateral walls running between the front and rear of the passenger area. The seats are positioned in rows on either side of at least one longitudinal aisle, running transversely thereto, so that the vertical median planes, or plane of symmetry of each seat adjacent to the aisle forms with the longitudinally-directed, vertical median plane, or plane of symmetry of the aisle, an acute angle opening towards the front of the seats.

SUMMARY OF THE PRIOR ART

It is well known that the designers of vehicles for transporting passengers try to accommodate an optimum number of passengers in each row of seats in acceptable conditions of comfort, while taking into account regulations stipulating a minimum width for the longitudinal aisles for safety during evacuation. Typically, in the conventional arrangement, each seat is positioned with respect to the aisle so that its vertical median plane, or plane of symmetry (which extends vertically through the center of the base and back of the seat), is parallel to the vertical median plane, or plane of symmetry, of each aisle (the latter plane extending vertically along the center and longitudinal direction of the aisle). Proposals have already been made to improve the comfort of passengers by modifying this conventional arrangement or organization of transverse rows of seats.

For example, in U.S. Pat. Nos. 2,414,730 and 2,947,349, the plane of symmetry of those seats which are adjacent to a lateral wall in the passenger area and the plane of symmetry of the aisle form an acute angle opening towards the front of these seats.

It is clear, however, that this angle must be at least 30° so that the backs of those seats which are adjacent to the lateral wall are at a sufficient spacing from this wall so that it is possible to install triangular shelves or foot-rests between these seats and this wall. Assuming that all the seats of the same transverse row have parallel planes of symmetry, the acute angle formed by the planes of symmetry of those seats which are adjacent to an aisle and the plane of symmetry of this aisle should consequently also be at least 30°, with the result that these seats inevitably overlap into and reduce the width of the aisle. Nevertheless, in order to have an aisle which is wide enough for the passage of passengers, the rows of seats which are arranged on one side of the aisle either have to be displaced longitudinally with respect to the rows of seats arranged on the other side of the aisle, as proposed in U.S. Pat. No: 2,414,730, thereby entailing a loss of space at the longitudinal ends of the passenger area, or the number of seats per row has to be reduced with the space used for foot rests, as is the case in the arrangement according to U.S. Pat. No: 2,947,349.

In another alternative arrangement of seats, shown in British Pat. No. 590,030, (1) the plane of symmentry of those seats which are adjacent to the aisle and the plane of symmetry of the aisle are parallel, (2) the plane of symmetry of those seats which are adjacent to a lateral wall in the passenger area and the plane of symmetry of the aisle forms an angle of from 15° to 45° opening towards the front of these seats, and (3) each seat, adjacent to the lateral wall, is displaced forwards with respect to the adjacent seat.

This arrangement of seats does not provide additional space in the aisle, nor does it improve access to the hand luggage compartments which are arranged beneath the ceiling of the passenger area. Moreover, this arrangement does not apply to the seats of the central rows of a passenger area having more than one aisle. The forward displacement of the seat which is adjacent to a lateral wall in the passenger area demands that the seats be independent, or demands the construction of more complicated, more unwieldy and heavier two-seat or three-seat units. It is preferable to avoid such independent seats or those two-seat or three-seat units in transport vehicles because, given the increase in the operational cost of transportation, mainly due to the rise in the price of fuel, it is now essential to use the room in the passenger area as best as possible to accommodate a maximum number of passengers in acceptable conditions of comfort and safety.

SUMMARY OF THE INVENTION

An object of the present invention is to provide an arrangement of seats which enables the number of seats per row to be increased while maintaining the same space per seat, or the space to be increased without reducing the number of seats per row in a passenger area of given dimensions so that the occupants can be more comfortable. A further object of the present invention is to provide an arrangement of seats that improves the ease of movement of passengers in the aisle and permits easy access to the suspended compartments for hand luggage.

According to the present invention, the plane of symmetry of the seats adjacent to a lateral wall in the passenger area and the longitudinal plane of symmetry of the aisle are parallel or form an acute angle opening towards the rear of the seats.

It has surprisingly been found that, when two adjacent seats, one of which is adjacent to a lateral wall are positioned so that their planes of symmetry converge towards the front of the seats, the width of the backs of the seats can be increased at the level of the shoulders and elbows of the occupants and the width of the bases can be reduced at the level of the legs. These seat modifications are desirable since the seat will more closely conform to the occupants' natural morphology. The increase of the width of the back of each seat at the level of the shoulders is particularly desirable because the average breadth across the shoulders of passengers from Europe and North America has increased approximately 25 mm between 1950 and 1980.

According to one aspect of the present invention, whenever the rows of seats are arranged between two longitudinal aisles, the plane of symmetry of the seats which are not adjacent to one of the aisles is parallel to the longitudinal plane of symmetry of the aisle.

The acute angle formed by the plane of symmetry of the seats which are adjacent to a lateral wall of the passenger area and the longitudinal plane of symmetry of the aisle is advantageously less than about 15° and more than about 5°.

The above acute angle is preferably 12°.

According to another aspect of the present invention, the acute angle formed by the plane of symmetry of the seats which are adjacent to an aisle and the longitudinal plane of symmetry of the aisle is less than about 15° and more than about 5°.

According to yet another aspect, the rows of seats which are arranged on one side of the aisle are displaced in the longitudinal direction of the aisle with respect to the rows of seats arranged on the opposite side of the aisle. This arrangement, which is in itself known, provides more space between the two adjacent rows of seats on either side of the aisle so as to permit easier access to luggage located above the seats adjacent to the aisle, without disturbing the traffic flow in the aisle.

According to yet another aspect of the present invention, the back of the seats may be reclined. While the use of reclinable backs by itself is known, when combined with the feature of the convergence of the planes of symmetry of adjacent seats toward the front of the seats, the reclining backs provide greater comfort for the passengers.

This seat arrangement allows the space between two adjacent backs of seats to be increased as a function of the degree of inclination towards the rear. This arrangement also creates more space between the shoulders of the occupants of these seats and improves the forward visibility of the passengers who occupy the seats situated behind the latter.

According to yet another aspect of the present invention is to provide a seat arrangement wherein two adjacent backs can be inclined forward so that portions of the backs come to rest on a shared armrest in a position where two adjacent backs form a continuous surface which is substantially parallel to the floor.

Further information and details about the present invention will emerge from the following description of arrangements with reference to the accompanying drawings which show, by way of example, only several embodiments of the present invention.

BRIEF DESCRIPTION OF THE DRAWINGS

FIG. 1 is a plan view of the interior of the passenger area of an aircraft having two longitudinal aisles, and a series of transverse rows of two seats between a lateral wall and each of the aisles and a series of rows of four seats between the two aisles, the seats being arranged in accordance with one embodiment of the present invention.

FIG. 2 is a partial view of a vertical section through the passenger area of FIG. 1;

FIG. 3 is an analogous view to FIG. 1 of a second embodiment of an arrangement according to the present invention having, on either side of the two longitudinal aisles, a series of rows of three seats;

FIG. 4 is an analogous view to FIG. 3 in which the transverse rows of seats between the aisles are displaced longitudinally with respect to the transverse rows of seats arranged between one of these aisles and an adjacent lateral wall;

In these Figures, the same reference numerals designate identical elements.

DETAILED DESCRIPTION

Figure 5:
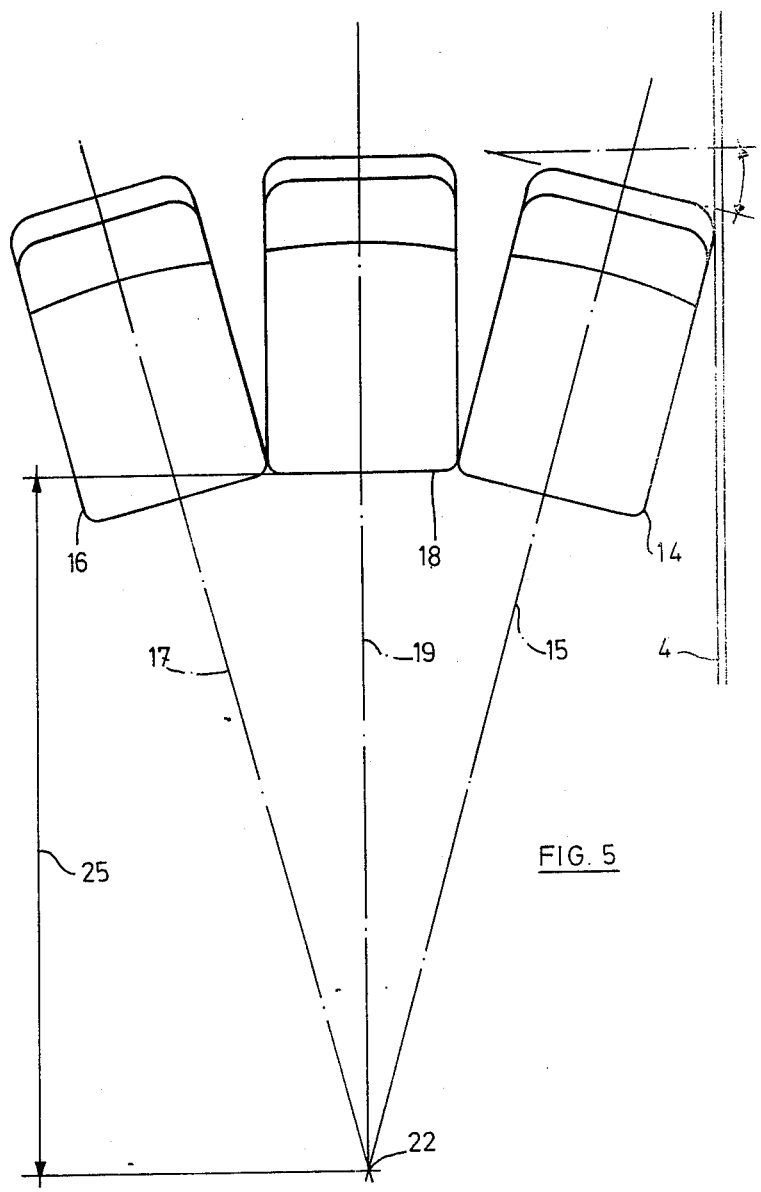
FIGS. 5 and 6 are large-scale plan views which show two stages for designing a multi-seat unit comprising three seats.

The seat arrangements described herein are intended for use in air, sea, river or land transport vehicles.

In the drawings, however, the arrangements are illustrated when applied to an aircraft. Referring to FIGS. 1 and 2, one passenger area is shown and consists of a floor 2, a ceiling 3 and lateral walls 4 fitted inside a fuselage between the front 5 and rear 6 ends indicated by the cutaway lines.

The passenger area comprises seats 7, each of which have a base 8, a back 9 and arm rests 10. These seats are arranged in rows which are spaced along two aisles 11-12, in a transverse direction thereto. These aisles have parallel longitudinal planes of symmetry 13. The seats adjacent to one of the aisles are indicated by 14 and the respective plane of symmetry, or vertical median plane, thereof is indicated by 15; the seats adjacent to one of the lateral walls are indicated by 16 and the respective plane of symmetry thereof is indicated by 17; while the seats which are not adjacent to an aisle or a lateral wall are indicated by 18 and the respective plane of symmetry thereof is indicated by 19.

The plane of symmetry 15 of each seat 14 adjacent to the aisles 11, 12 is inclined with respect to the plane of symmetry 13 of the adjacent aisle so that the respective planes of symmetry 13 and 15 form an acute angle 20 of less than about 15°, more than about 5° and preferably 12° opening towards the front of the seats.

The seats 16 adjacent to the lateral walls 4 are arranged differently, depending on whether the row between a wall and an adjacent aisle has two or three seats. Where the row has two seats, as shown in the arrangement illustrated in FIG. 1, the plane of symmetry 17 of each of the seats 16 is parallel to the plane of symmetry 13 of the aisles. When the row has three seats, as shown in FIG. 3, the plane of symmetry 17 of the seats 16, adjacent to a lateral wall 4, forms acute angle 21 with the plane of symmetry 13 of the adjacent longitudinal aisle, opening towards the rear. The angle 21 is less than about 15° more than about 5° and preferably 12°.

Seats 18 which are not adjacent to an aisle, nor to one of the lateral walls 4, each have a plane of symmetry 19 which as shown, forms the plane of symmetry or vertical median plane of the three-seat assembly and is parallel to the longitudinal plane of symmetry 13 of the aisles 11 and 12, as shown in FIGS. 1 and 3.

In the case of an arrangement which has rows of three seats arranged transversely between a lateral wall and an aisle, as shown in FIGS. 3 and 4, the acute angle 20 formed between the longitudinal plane of symmetry 13 of the aisles 11, 12 and the plane of symmetry of each of the seats 14 adjacent to an aisle, and the acute angle 21 formed between the plane of symmetry 17 of each of the seats 16 adjacent to a lateral wall 4 and the plane of symmetry 13 of the said aisle, are equal. It can be seen, in this instance, that the planes of symmetry 15 and 17 of the seats 14 and 16 converge to the same point 22 in front of the seats, as shown in FIG. 3 and 5.

The seat 18 which is arranged between two inclined seats 14 and 16 preferably has a plane of symmetry 19 which coincides with the point of convergence 22 of the planes of symmetry of the two adjacent seats.

In this three-seat configuration, a multi-seat unit may be formed by joining several seats to a common base.

Figure 6:
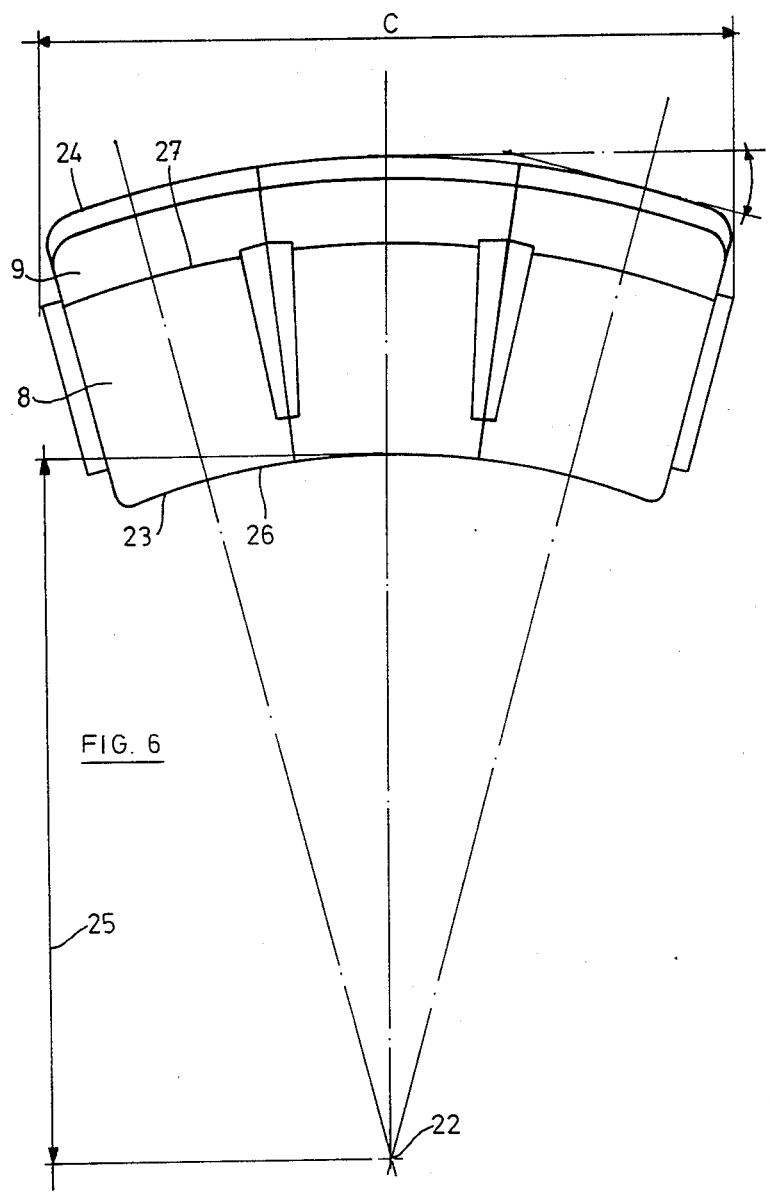

As shown in FIG. 6, the front sides 23 of the bases 8 and the rear sides 24 of the backs 9 of each seat in such a multi-seat unit form curved surfaces having a radius of curvature about a common vertical axis, defined by the intersection 22 of the planes of symmetry of the three seats which constitute the multi-seat unit.

The vertical axis is located at a spacing 25 from the front edge 23 of the bases 8. The spacing 25 is from 1800 mm to 2400 mm in front of the bases and preferably about 1900 mm from them.

In the preferred embodiment, which is shown in FIG. 6, the bases 8, which are shown in plan view, have a trapezoidal shape, the large side 26 of which forms the front edge of the base and the small side 27 of which forms the rear edge. On the other hand, the backs 9, seen front on, as shown in FIG. 2 are substantially in the shape of a hexagon having four opposite sides 30, 31, 32 and 33, which are parallel in twos, and two opposite sides 28 and 29 which are adjacent to the side 31 and inclined towards the plane of symmetry of the back. The sides 30 and 31, like the sides 32 and 33, are parallel to each other. Thus, a triangular opening 34 is formed between two adjacent backs, the base 35 of the triangular opening being situated at the level of the upper edge of the backs and the vertex 36 of the opening being situated at the level of the arm rests 10. When the backs are in a vertical position, the angle at this vertex between adjacent sides 29 is substantially equal to the angle of convergence, namely 12°, that is less than 15° and more than 5°. The backs may be advantageously inclined forwards, in a known manner, about a transverse pivot which is not shown, so that they come to rest on the arm rests. In this position, owing to the convergence of the adjacent backs, the sides 29 of adjacent backs are parallel and in contact with each other so that they form a flat top surface which is substantially parallel to the floor. In this instance, the angle of the vertex 36 is equal to 0°. The backs of the seats may be reclined, in a known manner, and, owing to the convergence towards the front of the planes of symmetry thereof, this enables the triangular opening 34 between two adjacent backs to be increased even further as a function of the degree at which they recline. Thus, more space is gained between the shoulders of the occupants of these seats and the field of view of the passengers who occupy the seats in the following rows is considerably improved.

In the embodiment shown in FIG. 4, the transverse rows of seats on one side of the aisles 11, 12 are displaced longitudinally with respect to the transverse rows of seats on the opposite side of the aisle at a spacing corresponding to about half of the "spacing" between successive rows. The term "spacing" is to be understood as designating the spacing between two corresponding points of two successive rows of seats and which is substantially constant for all the rows. This longitudinal displacement of rows of seats provides greater space in the aisles and thus facilitates access to the luggage compartment for the passengers, the presence of whom is shown in the Figures by reference numeral 40. Furthermore, the increased space in the aisles allows a passenger 40 to pass a service trolley 38 positioned in the aisle.

Figure 7:
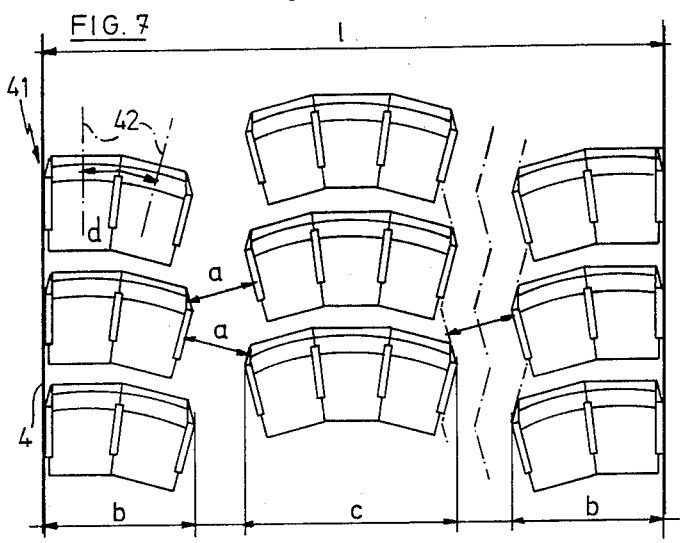
FIG. 7 is a plan view of an arrangement comprising seven seats per transerve row which are distributed between two longitudinal aisles.
Figure 8:
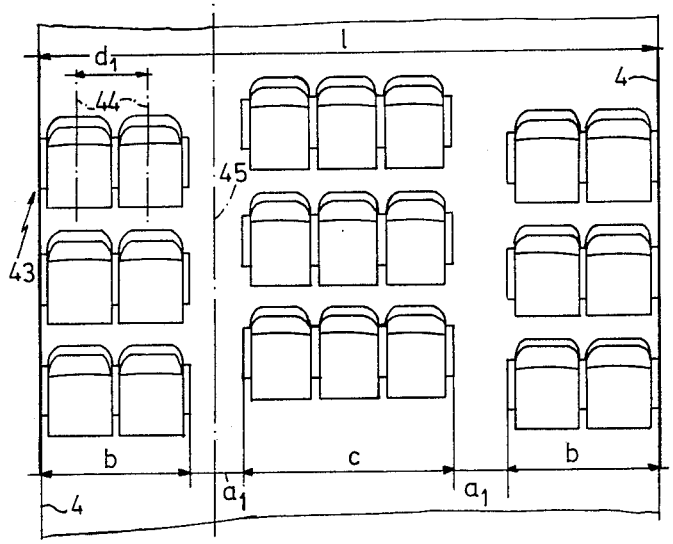
FIGS. 8 and 9 are plan views of known arrangements which were mentioned at the beginning of the introduction to the present specification.
Figure 9:
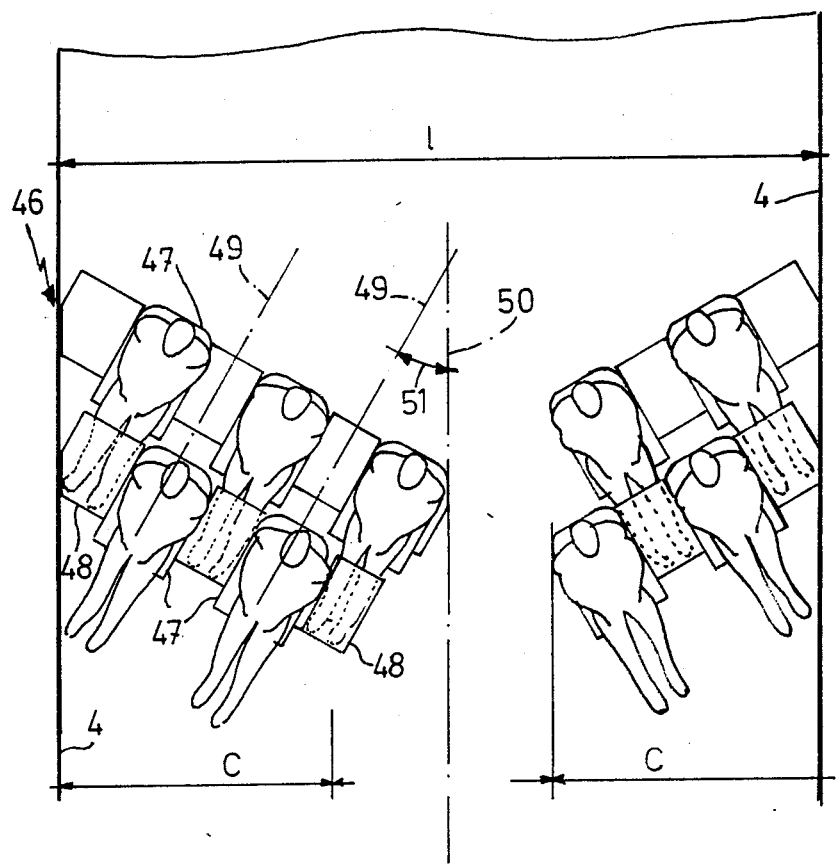

In order to illustrate the space which is gained by arranging seats according to the present invention, in comparison with two arrangements of known type, reference will now be made to FIGS. 7, 8 and 9. In FIG. 7, the reference numeral 41 designates the arrangement according to the present invention with transverse rows of two and three seats placed side by side, the planes of symmetry 42 of adjacent seats converge towards the front of the seats. In FIG. 8, the reference numeral 43 designates one of the known seat arrangements, wherein the planes of symmetry 44 of all the seats are parallel to the longitudinal plane of symmetry 45 of the aisle. In FIG. 8, the reference numeral 46 designates the other known seat arrangement, in which the planes of symmetry 49 of all the seats on the same side of the aisle are parallel and form an acute angle 51 of about 30° with the plane of symmetry 50 of the passage way, opening towards the front of the seats.

To enable a comparison to be drawn between the various arrangements, the rows of seats have been positioned on either side of at least one longitudinal aisle in a passenger area having the same width 1, namely 159 inches. Furthermore, all the rows of seats which are adjacent to one of the lateral walls 4 have been displaced longitudinally with respect to all the rows located on the other side of the adjacent aisle by the same distance which corresponds to half the constant "spacing" between successive rows.

In each of these three arrangements, the same fraction of the width 1 of the passenger area has been used for the rows depending on the number of seats; wherein
a row of two seats has a width b of 38 inches; and
a row of three seats has a width c of 57 inches.

It was found that there is a width a between opposite seats on either side of the aisle of 17 inches for the two aisles in the arrangement 41 in FIG. 7 according to the present invention, whereas in arrangement 43 of FIG. 8, there is only a width $a_1$ of 13 inches for the aisles between opposite seats on either side of an aisle. Currently, the minimum width for an aisle is fixed by international regulations at 15 inches. Consequently, using the arrangement 43 of FIG. 8, in order to comply with such regulations, only three times two, that is six seats (instead of the seven shown) can be fitted in a transverse row in a passenger area 159 inches wide and having two longitudinal aisles, whereas, using the arrangement 41 of FIG. 7, seven seats may be fitted in a transverse row, with two seats positioned between each aisle and the adjacent lateral wall and three seats between the aisles.

Furthermore, the spacing $d_1$ between the parallel planes of symmetry 44 of two adjacent seats is 18 inches in arrangement 43 of FIG. 8, whereas in arrangement 41 of FIG. 7, this spacing d is at least 19.6 inches and may even be 20 inches when the spacing 25 (FIG. 5 and 6) is equal to the preferred spacing of 1,900 mm, owing to the convergence of the planes of symmetry of these seats. Thus, with this latter arrangement, the passengers have greater width at the level of the shoulders.

Reference will now be made to the other known arrangement 46 shown in FIG. 9. The seats 47 are provided with legs-rests 48 and are arranged in transverse rows displaced longitudinally on either side of only one aisle in a passenger area having a width of 159 inches. Planes of symmetry 49 of the seats all are parallel, each plane forming with the plane of symmetry 50 of the aisle an acute angle 51 of about 30° opening towards the front of the seats. Owing to the degree of incline of the planes of symmetry of the seats and the arrangement of the leg-rests between the bases of the seats of the rows in front, it can be seen that two seats placed side by side together occupy a width c of 57 inches, that is 28.5 inches per seat. The number of seats which may be arranged over the width of the passenger area $$159 - 15 \neq \frac{144}{28.5} = 5.$$

On the other hand, in a passenger area of 159 inches having two aisles, each of 15 inches, that is 30 inches, the seats have to be distributed over a width of 159−30 =129 inches. The maximum number of seats is therefore $$\frac{129}{28.5} = 4,$$

instead of 7 which can be provided by the arrangement according to the present invention, as shown in FIG. 7.

It is clear that the present invention is not limited exclusively to the embodiments which are shown and that many modifications may be made to the shape, arrangement and make-up of certain of the elements required for the design thereof, on condition that these modifications do not contravene any of the following claims.

Thus, in an embodiment of the present invention which is not shown, the seats face the rear end of the passenger area, instead of facing the front end thereof.

We claim:

1. In a passenger aircraft of the type comprising a substantially cylindrical fuselage having a center axis and including a passenger area defined by a floor, side walls and front and back walls, an arrangement of seat assemblies disposed within said passenger area, said arrangement comprising:
   a plurality of said assemblies, wherein each of said assemblies comprises three contiguous seats including a middle seat and two end seats, each of said seats providing substantially the same individual sitting space for a passenger within said passenger area and having a vertical median plane extending through each said seat;
   wherein said seat assemblies are secured to said floor of said aircraft in said arrangement (1) so as to define at least one aisle, (2) so that the vertical median plane of each of said middle seats extends substantially parallel to or contains said center axis, and (3) so that the vertical median planes of said end seats of each assembly converge and substantially intersect in the vertical median plane of the corresponding middle seat of said assembly so that the vertical median planes of each of said end seats of each assembly form with the vertical median plane of the corresponding median plane of said middle seat substantially the same acute angle open towards the rear of said seat assembly, wherein said acute angle has a value less than about 15 degrees and more than about 5 degrees so that said arrangement makes more efficient use of said passenger area.

2. An arrangement according to claim 1, wherein said seat assemblies are positioned on said floor of said aircraft in said arrangement so as to define two aisles such that each of said assemblies is positioned either between one of said side walls and one of said aisles or between both of said aisles.

3. An arrangement according to claim 1, wherein said acute angle has a value of about 12 degrees.

4. In a passenger aircraft of the type comprising a substantially cylindrical fuselage having a center axis and including a passenger area defined by a floor, side walls and front and back walls, an arrangement of seat assemblies disposed within said passenger area, said arrangement comprising:
   a plurality of said assemblies, secured to said floor of said aircraft in said arrangement so as to define at least one aisle, each of said assemblies comprising at least two contiguous seats, each of said seats providing substantially the same individual sitting space for a passenger within said passenger area and having a vertical median plane extending through each said seat;
   wherein said seat assemblies are secured on said floor of said aircraft in said arrangement (1) so that a pair of said assemblies are positioned side by side so as to form a continuous series of adjacent seats, with two opposite end seats, and (2) so that the vertical median planes of said two end seats of each series converge and intersect the same or parallel planes, extending parallel to or containing said center axis at an acute angle open towards the rear of said seat assembly, wherein said acute angle has a value less than about 15 degrees and more than about 5 degrees so that said arrangement makes more efficient use of said passenger area.

5. An arrangement according to claim 4, wherein said seat assemblies are positioned on said floor of said aircraft in said arrangement so as to define two aisles such that each of said pair of assemblies are positioned between said aisles.

6. An arrangement according to claim 4, wherein said vertical median planes of said two end seats of each series converge and intersect the vertical median plane of said series at said acute angle, wherein said vertical median plane of said series extends substantially parallel to or through said center axis.

7. An arrangement according to claim 4, wherein said series includes two center seats, each having vertical median planes extending substantially parallel to or through said center axis.

8. An arrangement according to claim 4, wherein said acute angle has a value of about 12 degrees.

* * * * *

UNITED STATES PATENT AND TRADEMARK OFFICE
CERTIFICATE OF CORRECTION

PATENT NO. : 4,936,620
DATED : June 26, 1990
INVENTOR(S) : Braun, Francois and Braun, Ives It is certified that error appears in the above-identified patent and that said Letters Patent is hereby corrected as shown below:

On the title page:

Delete "Francois et al." and substitute therefor -- Braun et al. --; and

Line [75], delete "Braun Francois; Braun Yves" and substitute therefor -- Francois Braun, Yves Braun --.

Column 6, line 68, after "area" insert -- is --.

Signed and Sealed this

Eighth Day of October, 1991

*Attest:*

HARRY F. MANBECK, JR.

*Attesting Officer*  *Commissioner of Patents and Trademarks*